United States Patent
Redert

(10) Patent No.: US 7,528,830 B2
(45) Date of Patent: May 5, 2009

(54) SYSTEM AND METHOD FOR RENDERING 3-D IMAGES ON A 3-D IMAGE DISPLAY SCREEN

(75) Inventor: Peter-Andre Redert, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 143 days.

(21) Appl. No.: 10/571,816

(22) PCT Filed: Aug. 31, 2004

(86) PCT No.: PCT/IB2004/051617

§ 371 (c)(1),
(2), (4) Date: Mar. 15, 2006

(87) PCT Pub. No.: WO2005/027052

PCT Pub. Date: Mar. 24, 2005

(65) Prior Publication Data

US 2007/0057944 A1     Mar. 15, 2007

(30) Foreign Application Priority Data

Sep. 17, 2003    (EP)    .................................. 03103424

(51) Int. Cl.
*G06T 15/00* (2006.01)

(52) U.S. Cl. ........................ 345/420; 345/422; 382/131; 382/154; 382/264

(58) Field of Classification Search .......... 345/419–422; 382/100, 131, 154, 284, 264
See application file for complete search history.

(56) References Cited

U.S. PATENT DOCUMENTS

| 6,363,170 B1 * | 3/2002 | Seitz et al. ................... 382/154 |
| 6,515,662 B1 * | 2/2003 | Garland ...................... 345/427 |
| 7,167,181 B2 * | 1/2007 | Duluk et al. ................. 345/506 |

* cited by examiner

*Primary Examiner*—Phu K Nguyen

(57) ABSTRACT

A system includes a 3-D display device with a display screen, an addresser for addressing the 3-D screen, and a renderer having an input for a 3-D model and an input for at least one viewpoint for rendering image information for supply to the addresser. The renderer includes an initial part having an input for the 3-D model and for a main view point for rendering objects in the form of a main view point Z-stack. The Z-stack includes stack layers having RGB and Z-values. The renderer further includes a Z-stack constructor in which, from the main view point Z-stack generated by the initial stage, Z-stacks for additional viewpoints are constructed. An image information occlusion semantics stage is provided for generating image information from the Z-stacks.

9 Claims, 7 Drawing Sheets

SYSTEM AND METHOD FOR RENDERING 3-D IMAGES ON A 3-D IMAGE DISPLAY SCREEN

The invention relates to a system comprising a 3-D display device with a display screen, a means for addressing the display screen, and a renderer having an input for a 3-D model and an input for at least one viewpoint for rendering image information for supply to the addressing means.

The invention also relates to a renderer for use in a display device.

The invention also relates to a renderer for generating information to be an input for addressing means of a display device.

The invention also relates to a method for rendering data to be supplied to an addressing means of a 3-D display device.

Recently there has been a lot of interest in providing 3-D images on 3-D image display screens. It is believed that 3-D imaging will be, after color imaging, the next great innovation in imaging.

A 3-D display device usually has a display screen on which the images are displayed.

The information (data) needed for displaying the image is rendered by a renderer, which renderer comprises an input for a 3-D model and an input for a viewpoint.

Basically, a three dimensional impression can be created by using stereo pairs (two different images directed at the two eyes of the viewer), holographic techniques, or multiple planes in the displays. With the multiplanar techniques, a volumetric image is constructed, in which the 3-D pixels are replaced by so-called voxels in a 3-D volume. A disadvantage of most multiplanar displays is that the voxels produce light, but do not block it This leads to transparent objects, giving quite literally a ghostly and unpleasant appearance to the displayed images.

Display using a display screen, stereoscopic displays do not suffer from this problem. There are several ways to produce stereo images. The images may be time multiplexed on a 3-D display, but this requires that the viewers wear glasses with e.g. LCD shutters. When the stereo images are displayed at the same time, the images can be directed to the appropriate eye by using a head mounted display, or by using polarized glasses (the images are then produced with orthogonally polarized light). The glasses worn by the observer effectively route the views to each eye. Shutters or polarizers in the glasses are synchronized to the frame rate to control the routing. To prevent flicker, the frame rate must be doubled or the resolution halved with respect to the two dimensional equivalent image. A disadvantage with such as system is that the two images produce only a limited "look around" capability. Furthermore, glasses have to be worn to produce any effect. This is unpleasant for those observers who are not familiar with wearing glasses and a potential problem for those already wearing glasses, since the additional pair of glasses do not always fit.

Instead of near the viewers eyes, the two stereo images can also be split at the display screen by means of a splitting screen such as a parallax barrier, as e.g. shown in U.S. Pat. No. 5,969,850.

Although displays in view the view is split at the display screen are autostereoscopic in the sense that no special glasses are required to view the 3-D image, they often work only for one viewer at a fixed position in space. The viewing zone is very narrow. Outside the viewing zone, the observer sees multiple images or a stereo inversion, leading to a very unpleasant view. In practice this means that for many application, for instance in living rooms, the viewing zone is so small that the viewer has to be seated at one particular spot to be able to see a 3-D image.

The device known from U.S. Pat. No. 5,969,850 offers a solution to the narrow viewing zone problem by using a dynamic parallax barrier, i.e. a parallax barrier wherein the barrier slits move across the screen in this manner an autostereoscopic display device is produced.

The above describes different types and method for providing 3-D image which each have their advantages and disadvantages. The invention is not restricted to any particular type of 3-D device, although possibly of greater use for some types of devices than for others. The invention is directed to the renderer, i.e. the part of the system which renders the image information (data). There is a trend towards systems with display devices that are able to provide N-views, i.e. a large number of views on the display screen. Such devices are able to provide a 3-D image on a display screen that is visible over a relatively large viewing angle, for several viewers. The number of different views is typically from 10 to 100 views. It is for those types of 3-D image display devices that the invention is of particular interest.

One way of providing multiple images is to use as many camera's as there are images. This technique, however, is very costly, often impractical and not well suited for interactive games. Thus, in practice, the image information is often calculated or constructed, where the basis for the calculation or construction may in part be based on the information gathered by a camera.

In order to display the images, especially in 3-D gaming, a renderer is used. A renderer has to render the data for the images. For simple stereo displays, i.e. where the number of view points N=2, the renderer has to render data for two images, while for more complex 3-D, e.g. autostereoscopic displays, the number of views increases substantially, currently running to N~10, and for future 3-D displays it is expected that N~100, requiring the renderer to supply ever more views and thus ever more data. The renderer may be part of the display device itself, or may be a stand-alone device for providing image information to be supplied to the image device as an input for addressing means of or for the display device. It is in this respect of prime importance that not just for many views information must be generated but also, especially but not exclusively for 3-D games, the quality of the image is preferably substantially equal for each viewpoint.

Current rendering techniques use renderers which render image information, i.e. data, for each separate view, based on a 3-D model and the viewpoint of said separate view. Although such methods are useful for 3-D imaging with N=2, there is a trend which requires provision of an ever increasing number of view points, in order to increase the field of view and allow the image to be seen from many different view points. This is true especially but not exclusively for 3-D games. For instance, when multiples opponents (i.e. viewers) fight each other on a display screen it is important that all opponents fight on an equal basis. In order for this condition to be fulfilled a large number of view points with substantially equal image quality, with a high speed and high degree of details must be rendered. For interactive games all the data should be rendered in real time, thus requiring on-line rendering of large sets of data. Such conditions are difficult to obtain by present techniques.

It is therefore an object of the invention to provide an alternative to the known device enabling fast, accurate and detailed rendering of images for 3-D, e.g. autostereoscopic, display devices and an improved efficiency.

To this end the system in accordance with the invention is characterized in that the renderer comprises an initial part having an input for the 3-D model and for a main view point for rendering objects in the form of a main view point Z-stack comprising a stack of layers, each layer comprising an array of elements comprising color information and Z-values, the renderer further comprising a Z-stack constructor for constructing Z-stacks for additional viewpoints from the main view point Z-stack generated by the initial stage, and a further image information occlusion semantics stage for generating image information from the Z-stacks.

The renderer comprises an initial part which renders objects comprised in the to be displayed image in the form of a set of pixels with a color (RGB) and a depth value (Z). This initial stage has an input for the 3-D model and for a main view point. The output of this initial stage is a Z-stack comprising stacked layers comprising color (RGB or monocolor) information and a Z-value for the main viewpoint. The renderer uses the main view point Z-stack in a following Z-stack constructor in which, from the main view point Z-stack comprising color information (RGB or monocolor) information and Z-values for the main viewpoint, Z-stacks comprising color information (RGB or monocolor) and Z-values for the additional viewpoints are constructed. The respective Z-stacks are then, in a further image information occlusion semantics stage, converted into image information for supply to the addressing means.

When objects are generated they have RGB coordinates (colours, or in the case of a monochromatic image monocolor) as well as X-Y-Z coordinates (position in space) and sometimes opacity (a) values. Constructing an image from a view point basically entails projection of the objects on a plane corresponding to a view point. One of the most prominent features in rendering is the fact that objects in front occlude other, further-away objects. The renderer should take this into account, simple projection of all objects on the screen would lead to objects further away than foreground objects shining through such foreground objects, which would literally lead to a ghost-like appearance of foreground objects.

It is known that it is possible in rendering pipes (which is another word for a renderer) to generate images via a so-called frame/Z-buffer method. Each object in the 3-D model leaves the initial texture stage in the form of a set of pixels with (at least) a color (RGB) and a depth value (Z). In an occlusion semantics stage the Z-values of every object pixel are compared with the appropriate pixel in the Z-buffer. If the object Z-value is smaller (object closer to viewer than current object), the object's RGB and Z-value are copied in the appropriate pixel in a frame and Z-buffer respectively. This scheme starts with a black frame buffer and a Z-buffer filled with $-\infty$, after which all objects are entered through the rendering pipe. Finally, the frame buffer contains the image that serves as output of the rendering pipe. The final contents of the Z-buffer is not used. In principle, the frame and Z-buffer together form a so-called 'image+depth' data structure, meaning that every pixel has both color data RGB as depth Z. It is possible from RGBZ data in the frame buffer to render images from some other viewpoints with a moderate amount of processing. This type of additional viewpoint rendering however, has a substantial drawback: the quality of images rendered for the remaining viewpoints is lower than that of the main viewpoint. The image in the frame buffer contains a number of objects seen from the main viewpoint and although it is possible to calculate where these same objects would be in an image from another viewpoint and thus calculate the image from that viewpoint, it remains a problem that from the remaining viewpoints, other objects may (and thus should) be visible, that are not visible from the main viewpoint. Such objects are not present in the frame/Z-buffer and can thus never be rendered correctly in the images for the additional viewpoint. Likewise, even objects that are visible in the image as seen from the main viewpoint may have parts that are not visible from the main viewpoint but are visible from other view points.

In the present invention, the output of the initial stage is not a frame/Z-buffer but a main view point Z-stack. This Z-stack, although specific for the main view point, comprises almost all relevant information needed for the generation of images from all remaining viewpoints, both close and further-away from the main viewpoint. A Z-stack, within the concept of the invention, is a stack (i.e. a number of layers) of arrays of elements having data (RGB- (or monocolor) and Z-value, and possible a-value) wherein the first layer comprises the elements and thus those (parts of) objects as first seen from the main point of view, the second layer the objects or parts of the objects located, as seen from the point of view, behind objects or parts of objects of the first layer, the third layer comprises objects behind the objects or parts of objects in the second layer of the stack. It will be clear to those skilled in the art, that, whereas calculations are nowadays usually conventional done by means of some computer or computer program, that "the stack" is to be interpreted this light, i.e. as a description of an arrangement of data generated and/or stored in a computer. Objects (or parts of objects) not visible in the main viewpoint, i.e. hidden from view by other objects or parts of objects. (and which are thus not present in frame/Z-buffer as described above) are still present in the main view Z-stack, namely in the second, third etc. layer of the stack. It is to be noted that parts of a single object may be distributed over more than one layer in the stack.

A device in accordance with the invention comprises a Z-stack constructor, after the initial stage an additional 3-D rendering stage, for rendering a Z-stack for each additional viewpoint, on the basis of the Z-stack for the main viewpoint. So, for each of the additional view points a new Z-stack is made on the basis of the main view point Z-stack. One viewpoint, the main viewpoint, enters the rendering pipe and is dealt with in normal fashion, while the additional N−1 viewpoints enter in an extra stage, internal in the renderer. In this way, the largest part of the render pipe remains monoscopic, i.e. for one view point, and is used commonly for all N images, as is the following occlusion semantics stage.

The original main view Z-stack comprises almost all relevant information needed for the generation of images from all remaining viewpoints, both close and further-away from the main viewpoint. From this main view point Z-stack the new Z-stacks are generated for the additional viewpoints. These Z-stacks comprise themselves also almost all information, the images for the additional view points are therefore of substantially equal image quality as the main view point image.

In this way, a large increase in speed and simplicity of the algorithms is achieved, as compared to constructing N different view points independently. Also, a large increase in quality is achieved as compared to generating a frame/Z-buffer for the main view point and constructing images for other view points from the main view point frame/Z-buffer.

Ideally, after all rendering is done, all Z-stacks contain foreground objects as seen from the viewpoint corresponding to each Z-stack. The number of elements with which the object is represented may not be the same in different Z-stacks, as an object may appear with different size as seen from different viewpoints. Therefore, there is no one-to-one correspondence between elements among Z-stacks, while there is a one-to-one correspondence as far as the presence of an object is concerned. When constructing additional Z-stacks on the basis of one main viewpoint Z-stack, objects can be copied on a one-by-one basis, while copying elements on a one-by-one basis is insufficient. The latter would lead to problems when e.g. an object is represented in the main Z-stack by 100 elements but should be represented in a new Z-stack by 110 or 90 elements. It is the insight of the inventors that an object-by-object method in combination with scaling of the number of elements within an object, e.g. by extrapolation or contraction is preferred over an element-by element basis.

Therefore the renderer preferably comprises an object extractor for extraction of objects from a Z-stack. Extracting within the framework of the invention means grouping elements of the Z-stack into groups based on a grouping criterion. Elements which belong to one and the same object usually have the same or similar Z-values (or if they have not than there is a clear regular change of the Z-values going from one element to a neighboring element). Furthermore they may have the same or similar RGB values.

It is advantageous to group the elements of the main view point Z-stack into objects. This enables to copy objects on a one-by-one basis from the main view point Z-stack to a new Z-stack for an additional view point. The contraction and extrapolation operations are basically resampling operations which are well known within the computer graphics area In the preferred embodiment the object extraction is done only for the main viewpoint Z-stack, ensuring efficiency independent from the number N−1 of additional viewpoints. The knowledge about the size and shape of objects prior to constructing of additional viewpoints enables high-quality implementations of the resampling of elements within objects needed for extrapolation and contraction.

Preferably the renderer comprises a DOF rendering stage. DOF (depth-of-field) is related to the fact that there is a focus plane in which the objects are in focus, while objects further away from the focus plane are more or less blurred. Blurring can be established by spatial redistribution of RGB values in the object texture and around the edges of an object, or by small changes in the opacity of objects. DOF blurring may be performed on each of the additional view point Z-stacks, but is preferably performed on the main point view Z-stack. The result is a Z-stack for the main point view with RGB and Z values (and possibly with opacity) data taking into account the blurring due to DOF. The focus plane is almost always roughly the same for the additional points of view. Therefore DOF blurring for the main point of view and then using a "blurred" main view point Z-stack as a basis for generating Z-stacks for all additional view points gives almost as good an end result (in quality) as using a main view point Z-stack, generating Z-stacks for the additional view points and then performing DOF blurring for all additional view point Z-stacks, while the speed is greatly increased.

The Z-stack constructor may construct additional view point Z-stacks sequentially (i.e. one after the other) or in parallel. It is preferred that this is done in parallel. When done in sequence the Z-stack constructor may construct a first additional view point Z-stack from the main point, and use this for constructing further Z-stacks. Such sequential processing, however, carries the risk that small errors accumulate. Preferably, therefore, whether in sequential or parallel processing, each additional Z-stack is calculated on the basis of the main view point Z-stack.

Preferably the main point view Z-stack data comprises data on the opacity and the Z-stack constructor also comprises means for adapting, after object extraction, the opacity of objects.

Occlusion of objects is hereabove described. Apart from occlusion (i.e. one object not being visible when behind another object as seen from the point of view) opacity may also play a role. Some objects may be (semi)-transparent. Objects situated behind such objects are to some extent visible. The concept of opacity, i.e. giving the objects also an opacity enables to take such effects in consideration. Basically the opacity (e.g. a number between 0 and 1) gives a measure of how much of the intensity of further laying objects is to be visible in the image. When the opacity is 0 the object is opaque (i.e. objects behind the object do not shine through), when the opacity is 1, the object is fully transparent and further objects do shine through. Indicating in the main view point Z-stack the opacity (usually denoted by a) enables a more lifelike image rendition. Simply transferring these opacity data to the additional view point Z-stack is useful. However, the opacity of an object may be dependent on the point of view, since for instance for a flat plate the opacity increases with angle of view through the flat plate. By adapting the opacity, a more lifelike image rendition is possible.

In case the opacity data are split in opacity data different for different colors, the importance of this aspect becomes even greater.

Preferably the Z-stack constructor also comprises means for adapting, after object extraction, the RGB values of objects.

The main view point Z-stack comprises color information, e.g. RGB values. In embodiments of the invention these RGB values may be left unchanged as the view point is changed. However, for some objects the colors changes as the angle of view is shifted, often becoming brighter or dimmer or changing in color as the point of view changes. In preferred embodiments the Z-stack constructor allows for such changes.

Preferably the system comprises an input for data on additional view points. The Z-stack constructor constructs data for additional view points. It may do so automatically, in which case it could e.g. construct data for as many Z-stacks as there could be views in 3-D display devices, i.e. a large number covering all display devices possible. This would require a large number of additional view points Z-stacks to be constructed. Preferred, however, is that the system comprises an input for supplying data on the additional view points to the additional view point Z-stack constructor. Depending on the type of display devices the number of additional view points may vary. By providing an input for providing specific data on the additional view points (number and/or position/orientation with respect to the main view point) the Z-stack constructor is able to provide additional view point Z-stacks in accordance with the requirements, increasing efficiency. The data on the view points, in simple embodiments, could e.g. be the number of views to be generated and the maximum viewing angle range. In preferred embodiments the system comprises means to establish the view points corresponding to the preference of a user, or means to be supplied with data corresponding to the view points of the users. For instance when more than one player participates in a 3-D game, the use of goggles, head phones, laser guns, badges etc. could enable the system, if such attributes are provided with means for establishing the position of such attributes with respect to the display device, for instance by means of IR or ultrasound sensors, to establish the precise or approximate location of the player with respect to the display screen of the display device. Providing such information to the additional Z-stack constructor would enable the view points corresponding with the players to be processed with high accuracy or refreshment rate, while the other view points are not, or at a lower accuracy or refreshment rate processed. This allows a considerable increase in speed and image quality for those view points that actually matter, i.e. the ones relevant for the players, without requiring a substantial increase in costs.

These and other aspects of the invention are apparent from and will be elucidated with reference to the embodiments described hereinafter.

In the drawings.

The Figures are not drawn to scale. Generally, identical components are denoted by the same reference numerals in the Figures.

Figure 1:
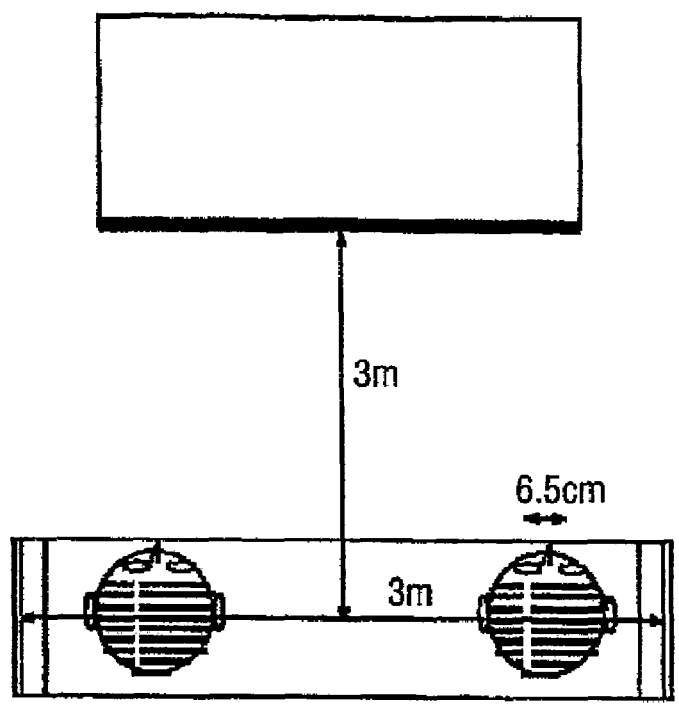
FIG. 1 illustrates the basic principle of a display device.

FIG. 1 illustrates a display device. For a three-dimensional television one needs a large number of viewing directions in which light is emitted independently. In a domestic application, the viewing distance is approximately 3 m and people sit on a couch that is approximately 3 m wide, see illustration 1. So a viewing angle of at least 60-degrees is needed. Our eyes are positioned at 6:5 cm from each other. To arrive at different pictures for each eye, the display needs to emit light in at least 3 m/6:5 cm=300/6:5=50 directions. To arrive at a three-dimensional picture without discontinuous transitions if one moves one's head, a three-dimensional television should emit light in much more than 50, say at least 100, directions. One way, to which the invention is not restricted, of creating a large number of views is the use of a parallax barrier.

Figure 2:
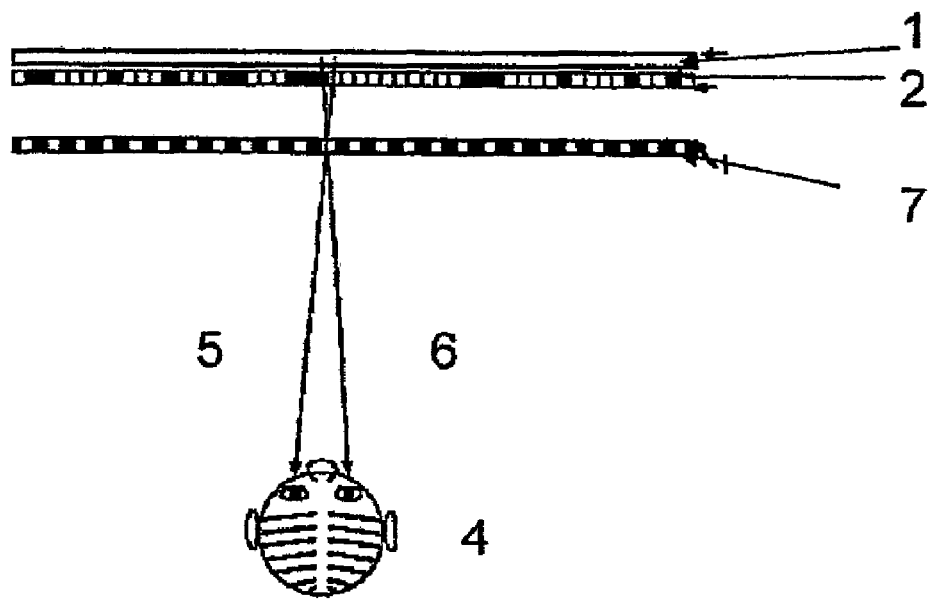
FIG. 2 illustrates the basic principle of a parallax barrier splitting two stereo images.

FIG. 2 illustrates the basic principle of a parallax barrier splitting two stereo images. The vertical lines of two stereo images are alternatingly displayed on, e.g., a spatial light modulator (e.g. a LCD) with a back light. The grating structure of the parallax barrier 7 ensures that each eye of the viewer 4 sees the appropriate image (5, 6). This is simply shown to illustrate a 3-D imaging system, it is not to be taken as a restriction on the scope of the invention.

Figure 3A:
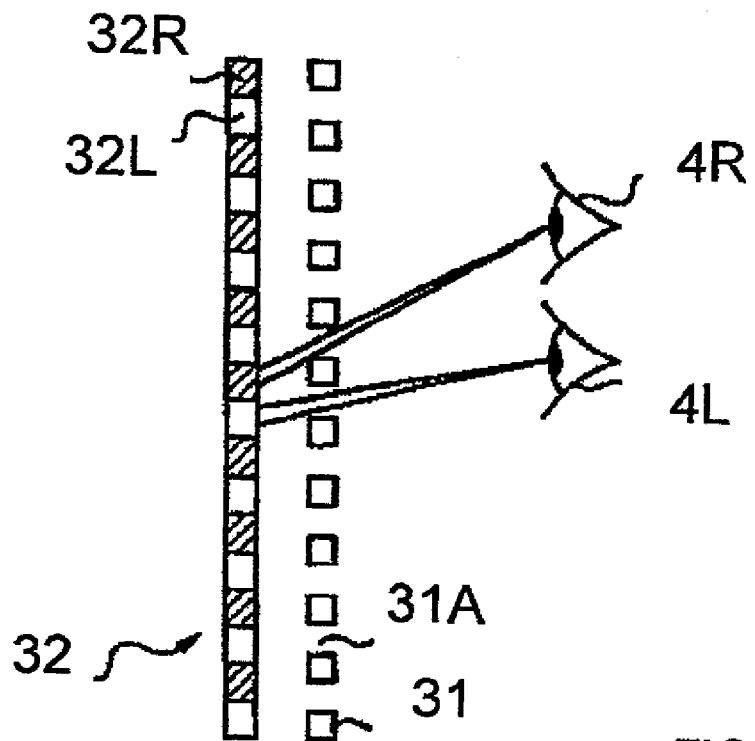
FIGS. 3A and 3B illustrate the principles of a barrier and a lenticular screen.

FIG. 3A illustrate the use of a parallax barrier.

In a conventional barrier auto-stereoscopic display system, a barrier 31 is disposed in front of a display array 32. The left and right images of a stereo pair of images are sliced into vertical strips. The strips 32L of the left image and the strips 32R of the right image are alternately disposed on array 32. Slots 31A are formed in barrier 31. Slots 31A are positioned so that the left eye 4L of an observer can see only strips 32L of the left image and the right eye 4R can see only strips 32R of the right image of the pair. The observer reconstructs the full image in three dimensions.

Figure 3B:
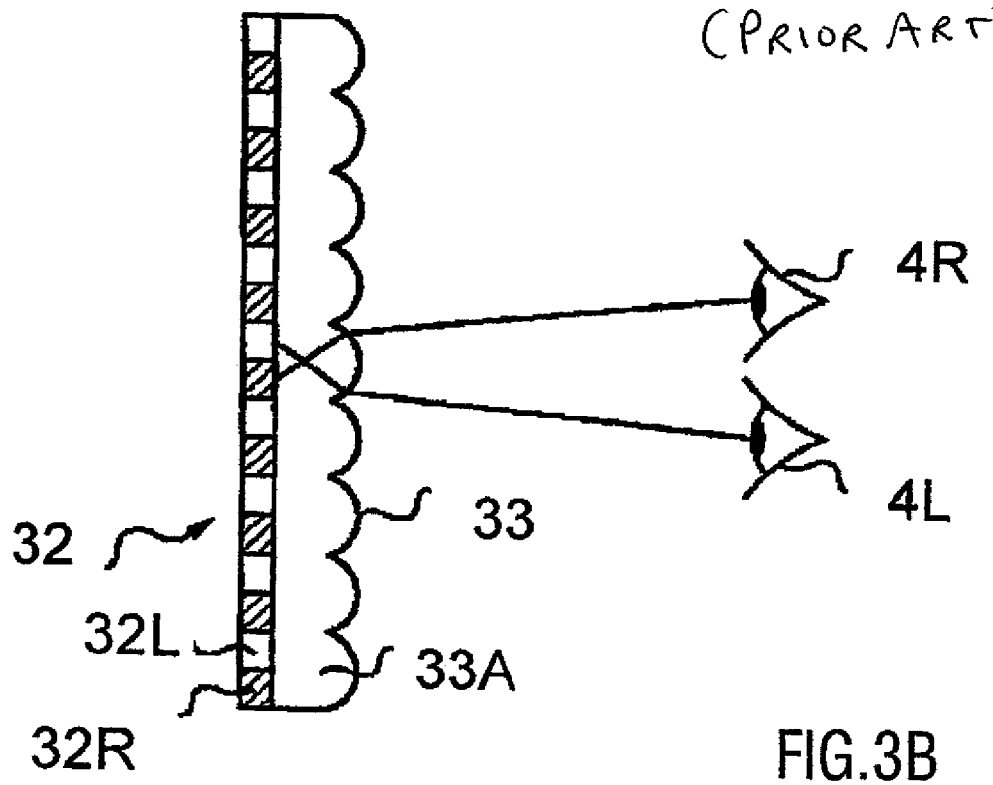

Referring now to FIG. 3B, a similar principle is explained in which barrier 31 is replaced by a lenticular lens screen 33 having an array of vertical cylindrical lenses 33A each corresponding to a different pair of left and right image strips 32L and 32R In operation each lens directs the left eye 4L of an observer onto a left image strip 32L and the right eye 4R of the observer onto a right image strip 32R.

Figure 4:
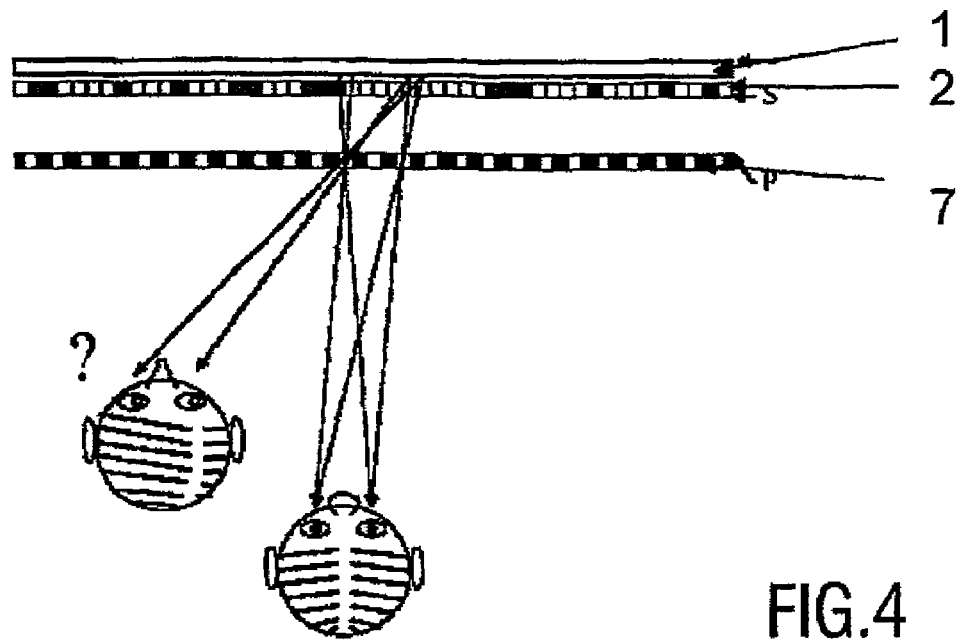
FIG. 4 illustrates the problem encountered with a basic parallax barrier display.

FIG. 4 illustrates the problem of a basic stereoscopic device. A viewer which is not seated within the right viewing zone is confused. The viewing zone is very narrow. Outside the viewing zone, the observer sees multiple images or a stereo inversion, leading to a very unpleasant view. In practice this means that for many application, for instance in living rooms, the viewing zone is so small that the viewer has to be seated at one particular spot only to be able to see anything. For living room use this is far from optimal since only one viewer can see the 3-D image and then only when seated on one spot.

Figure 5:
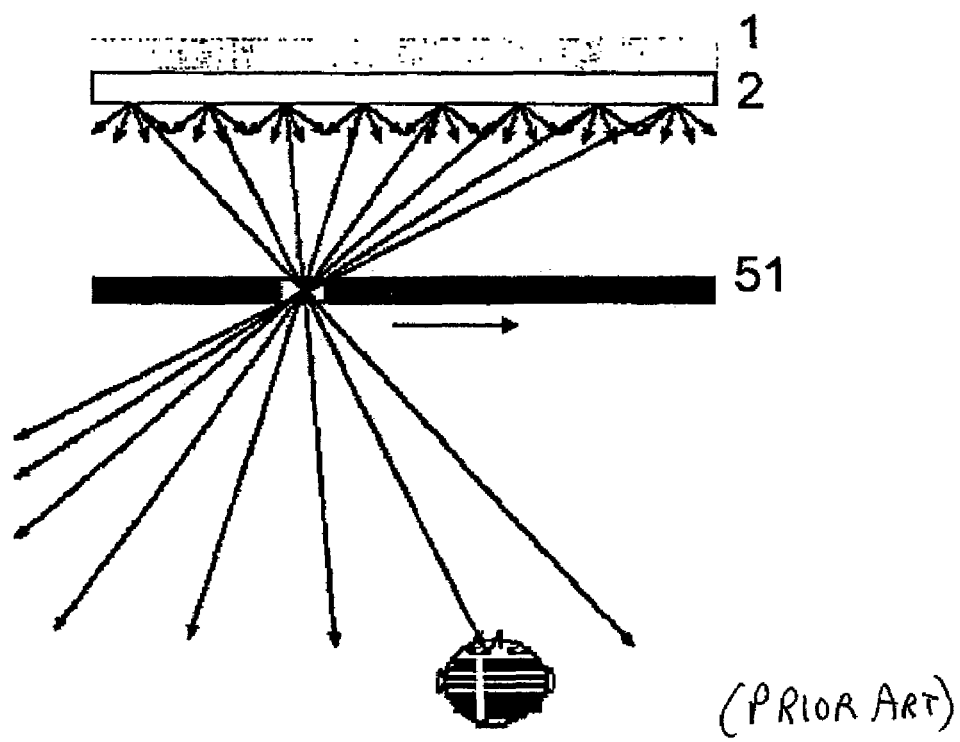
FIG. 5 illustrates a known multi-view devices.

FIG. 5 illustrates schematically a device as known from U.S. Pat. No. 5,969,850. In this device a solution to the narrow viewing zone problem is offered by using a dynamic parallax barrier 51, i.e. a parallax barrier wherein the barrier slits move across the screen. As the parallax barrier moves is scanned across the screen a large number of views (N views) are generated. In order to provide a large number of views, data for these images must be generated. The above Figures illustrate, by means of example, some types of 3-D display devices, they are, however, not to be taken as a restriction on the scope of the invention. Other techniques have been proposed to provide 3-D images, in particular to provide N-view displays.

However, all techniques and systems must lead to a large number of views (typically 10 to 100) to enable a large enough viewing zone and enable multiple viewers to view the image. For 3-D gaming there will also often be an interaction between the viewer and displayed image, requiring a wide range of possible view points (if a movie if shown the view point of the viewer with respect to the objects is often restricted, whereas in a 3-D game, this is much less the case), the system also has to be able react to the actions of the viewer. For 3-D gaming it is also of the utmost importance that all viewers and participants have views of comparable quality, otherwise the game cannot be sold as "multi-user" since if the person sitting right in front of the screen has a view of higher accuracy or speed, he/she has a better chance of winning the game, which is unacceptable (except perhaps for the winner).

So a large number of views of equal quality has to be rendered, and in real time and with comparable quality for the different views. It is to this object that the invention is directed, in particular to rendering data for N images.

Figure 6:
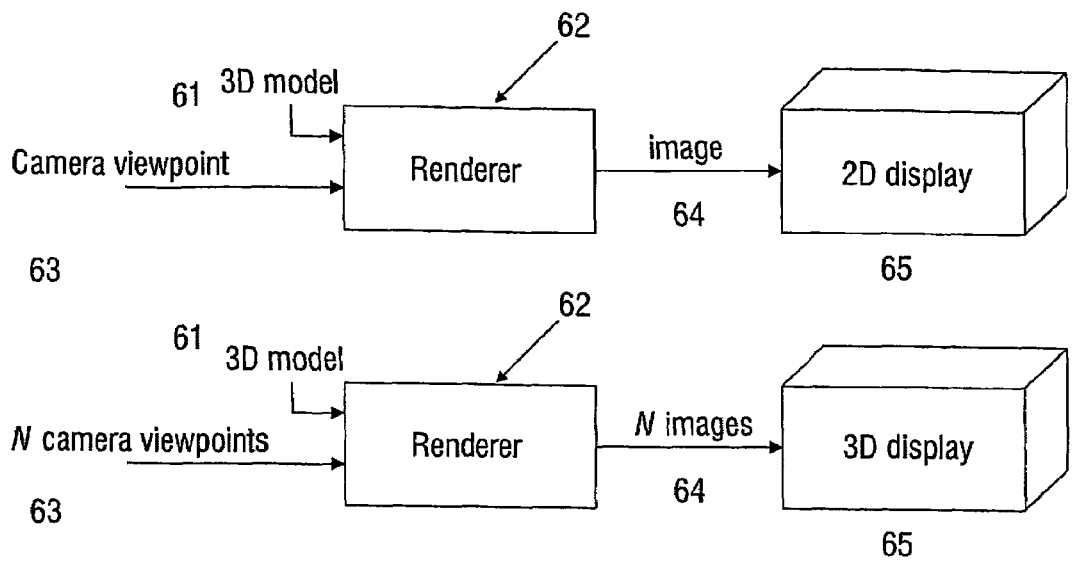
FIG. 6 illustrates current rendering methods.

FIG. 6 shows current rendering methods in 3-D gaming, for both 3-D and 3-D displays. During the game, a 3-D model 61 contains all objects at specific positions in specific states, varying dynamically. The model is fed into a render pipe (renderer) 62 together with a camera viewpoint or view points 63. For a normal 3-D display, the render pipe 62 yields a single image. The image data 64 rendered by the rendering pipe are sent to a display device 65.

For a 3-D display, the render pipe yields N images. For simple stereo displays, N=2, while for autostereoscopic 3-D displays N is larger (N~10), and for future 3-D displays it is expected that N~100. The invention, although in it's broadest sense applicable for N=2, is in particular advantageous for N-view (N~10, to N~100 or more) display devices.

Current rendering pipes do not contain two or more full monoscopic pipes, rather a single monoscopic pipe is used in temporal multiplex. This is at the cost of frame-rate (number of images per second), or whatever computation trade-offs are possible (e.g. a reduction in resolution to maintain a certain frame rate).

The burden on the render pipe for high N is extreme. In 3-D rendering, only the case of N=2 is used currently to support the only commercially available 3-D displays on the basis of 3-D goggles.

One of the most prominent features in rendering is the fact that objects in front occlude other, further-away objects. Nowadays, this is implemented in rendering pipes via a so-called frame/Z-buffer method. Each object in the 3-D model leaves the texture stage in the form of a set of elements with (at least) a color (RGB) and a depth value (Z). The occlusion semantics stage compares the Z-values of every element with the appropriate element in the Z-buffer. If the element's Z-value is smaller (object closer to viewer than current object), the element's RGB and Z-value are copied in the frame and Z-buffer respectively. This scheme starts with a black frame buffer and a Z-buffer filled with −∞, after which all objects are entered through the pipe. Finally, the frame buffer contains the image that serves as output of the rendering pipe. The final contents of the Z-buffer is not used. In principle, the frame and Z-buffer together form a so-called 'image+depth' data structure, meaning that every element or pixel has both color data RGB as depth Z. It is possible from RGBZ data in the frame buffer to render images for some other viewpoints with a moderate amount of processing. This type of additional viewpoint rendering however, has substantial drawbacks: the quality of images rendered for the remaining viewpoints is lower than that of the main viewpoint, and the larger the difference between the remaining viewpoint and the main viewpoint, the lower the quality of the data for the remaining viewpoint. The image in the frame buffer contains a number of objects seen from the main viewpoint. It is possible to calculate where these same objects would be in an image from another viewpoint and thus calculate the image from that viewpoint. However from the remaining viewpoints, other objects may be visible, that are not visible from the main viewpoint for the simple reason that such objects are not present in the frame/Z-buffer and can thus never be rendered correctly. Likewise, even objects that are visible in the image as seen from the main viewpoint may have parts that are not visible from the main viewpoint but are visible from other view points. To some extent it could be guessed how such "missing parts" look like (usually by extrapolating of the visible parts) and this may help, but only for views close to the main viewpoint. For example, if an arm is partially shown, the position of the rest of the arm may be guessed, and one can be relatively sure that there is a hand at the end of the arm, but what weapon would be in the hand and how the position would be positioned with respect to the arm would be unknown.

It therefore remains a challenge to provide a system and a method which enables rendering of N images with substantially equal image quality without the need of excessive computational power.

Figure 7:
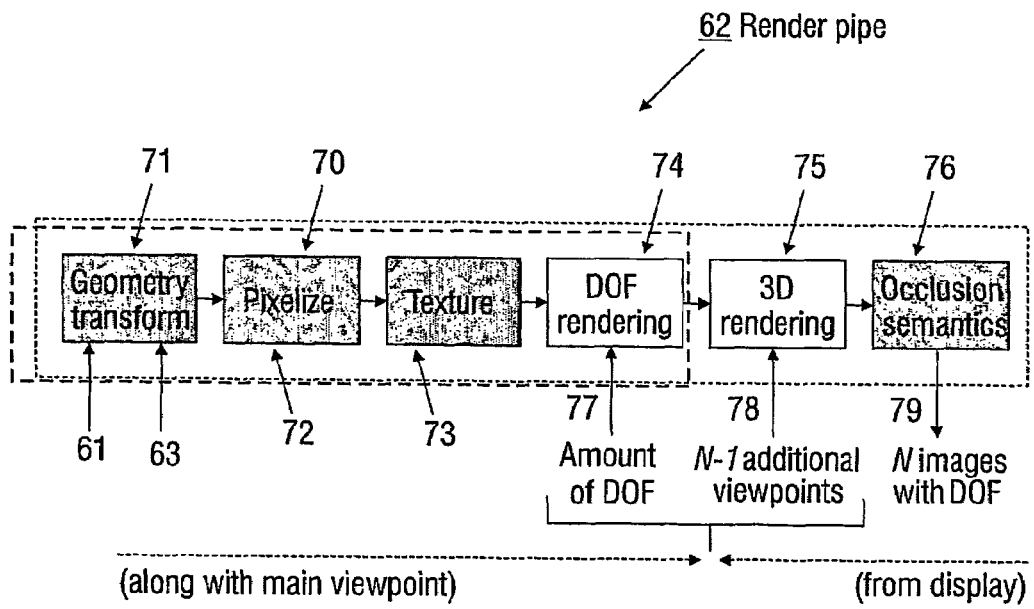
FIG. 7 illustrates schematically a render pipe for a display device and a method in accordance with the invention.

FIG. 7 illustrates a renderer (rendering pipe) 62 for a display device in accordance with the invention and a method in accordance with the invention.

The renderer 62 comprises a first part 70 for generating a Z-stack for the main viewpoint. This part comprises in this example an input 63 for the main viewpoint and an input 61 for the 3-D model. All geometries (shapes and forms of the objects) are transformed in geometry transformer 71 in accordance with the main viewpoint, the data are pixelized in pixelizer 72, i.e. all objects are transformed into pixels having an X, Y, Z, color (RGB) and possible also an α (opacity or transparency) value, and texture is added in texturizer 73. For the main viewpoint DOF (depth of Field) is added in DOF renderer 74. This is done for the data relating to the main viewpoint. So this is done only once for the main view point regardless of the number N−1 of additional viewpoints. Thereafter the data (in the form of a Z-stack as will be explained below) for the main viewpoint is used as a basis in 3-D rendering stage 75, which has an input for data relating to the remaining N−1 additional viewpoints, and renders as an output N−1 Z-stacks for the N−1 additional viewpoints. In the occlusion semantics stage 76 the data in the N−1 additional view point Z-stacks (together with the data in the Z-stack for the main viewpoint) are converted by means of Z-tracing into N frame buffers for N images from N different viewpoints. The computational requirements are relatively small since the first part of the processing which usually requires the largest amount of computational power (upto and including step 74) is done for the main viewpoint only. The resulting main viewpoint Z-stack (with DOF in this example) is the basis for all the other viewpoints.

The method in accordance with the invention and the system in accordance with invention enable efficient computation of N high-quality views, while existing methods based on frame/Z-buffers provide only low-quality views, and while existing methods based on generating N views completely independent are not efficient.

Figure 8A:
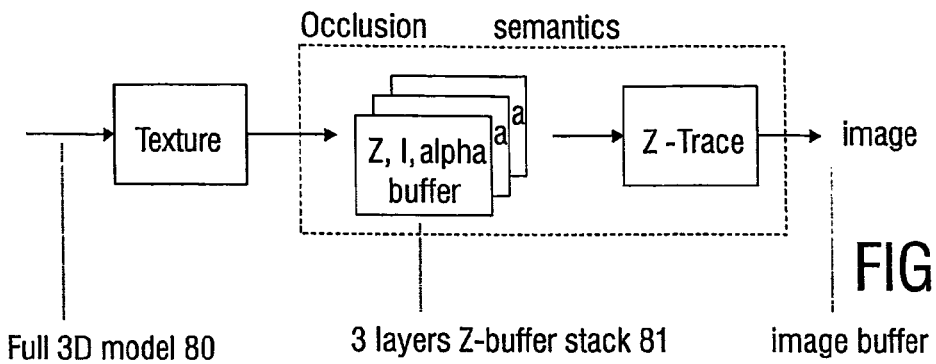
FIGS. 8A-8C illustrate a detail of a render pipe for a display device and method.
Figure 8B:
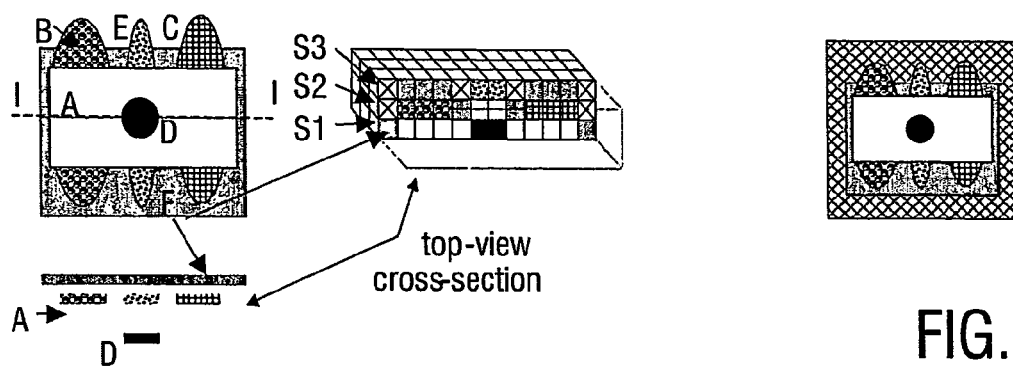
Figure 8C:
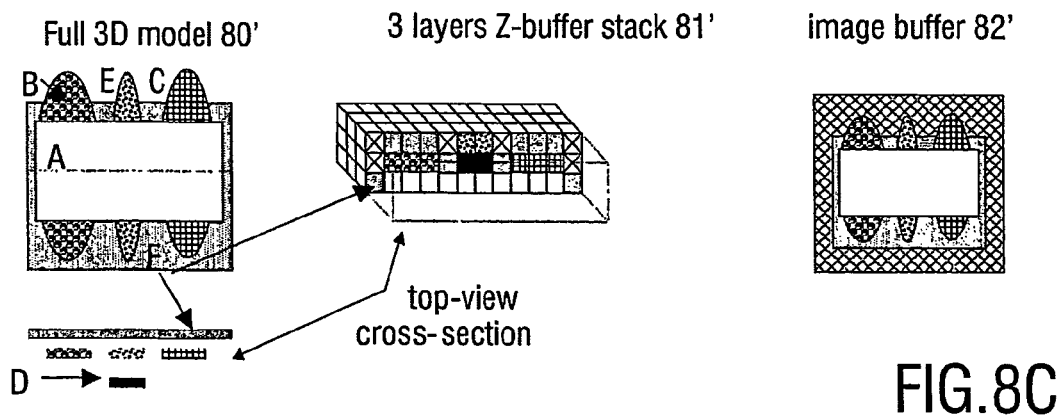

FIGS. 8A-8C illustrate further the construction of the Z-stack, and the frame buffer for the different view points.

The 3-D model 80 comprises all information i.e. all objects and their mutual orientation. From the full 3-D model a 3 layer Z-stack 81 for the main view point is produced. This is done by a Z-stack constructor schematically indicated in FIG. 8A which constructs a layered structure of (in this example) three sequential buffers comprising elements, wherein for each element (in this example) a Z, I (which stands for color), alpha (which stands for the opaqueness factor α) value is stored. Basically the first stack of the Z-stack comprises the RGB (color information) and Z-coordinate (and possibly also the alpha information, and possibly also further information) of all elements that are first seen from the view point. Thus the first layer of the Z-stack comprises those objects and parts of objects that are first seen, i.e. the elements which are closest to the view point. In this example thus, the first layer S1 of the Z-stack along the central line I-I comprises parts of object D, some parts of object A, and the outer fringes of object F, the second layer S2, along the same line, comprises parts of objects B and C, parts of object F, and parts of object A (the parts behind object D), the third layer comprises parts of object F (those parts behind objects B and C) and object E. It is to be noted that one and the same object may form part of several layers in the Z-stack, due to the fact that as seen from the main viewpoint it is the first, second or third object to be seen. Having constructed the Z-stack a frame buffer may be constructed which basically, if the objects displayed in the first stack are all opaque, comprises the data of the first stack S1 of the Z-stack. If the objects have a transparency (i.e. the alpha number is less than 1, wherein the value for α ranges from 0 (opaque) to 1 (fully transparent)), then the image buffer comprises a combination of data from the respective layers S1 to S3. The data from the image buffer 82 are sent to the 3-D display either directly or after further processing. In FIG. 8B, a 3-D model 80 is shown which ultimately leads to a frame buffer 82 which still comprises at least some data on all of the different objects A to E which constitute the original 3-D model. Starting from the frame buffer 82 it is, to some extent, possible to generate images for different views, be it that the shapes of the B, C, E objects behind object A have to be guessed on basis of those parts of the objects B, C, E that are visible in the frame buffer. It is, however, not always possible. To illustrate this, FIG. 8C differs only from the situation as depicted in FIG. 8B in that the object D is now placed behind object A. The Z-stack 81' reflects this change in that the elements depicting the object D do not longer form part of the first layer S1, but of layer S2. The image buffer 82' does no longer comprise any trace of object D, object D is simply is no longer present in the frame buffer 82'. Based on the image (or frame) buffer 82' for the main viewpoint, one could generate images for differing viewpoints, these images, however, cannot comprise the object D, for the simple reason that there no information (elements) on the object D present in the image buffer 82'. Even if, on the basis of previous images, it could be deduced that such an object should be, or most likely will be, present, the actual position and/or shape of the object would have to be guessed. However, from a different view point the object D may very well be visible. One solution for this problem would be to calculate (steps 61-73(74)) for each additional view point the Z-stack, i.e. using a completely separate rendering pipe for each view point. This however, requires a very substantial computing power. The basis of the invention is that the information on the "hidden" objects, such as object D in the example is, however, present in the 3-or more in general n-layer Z-stack 81' for the main viewpoint. Using the Z-stack 81' for the main view point enables to keep track of a number of objects that are behind foreground objects. This enables also correct rendering of semi-transparent objects, even if the final image sent to the display shows multiple objects located at the same pixel. In this approach, first all scene objects in the full 3-D model are rendered into the Z-stack. Then, a single well known process adopted here as Z-trace method extracts from the Z-stack the frame or image buffer to be sent to the display. The output image information is constructed per-pixel from the Z-stack according to a simple protocol. If all objects are opaque objects, the first layer of the Z-stack is just copied. For transparent objects, several layers may be merged.

Figure 9:
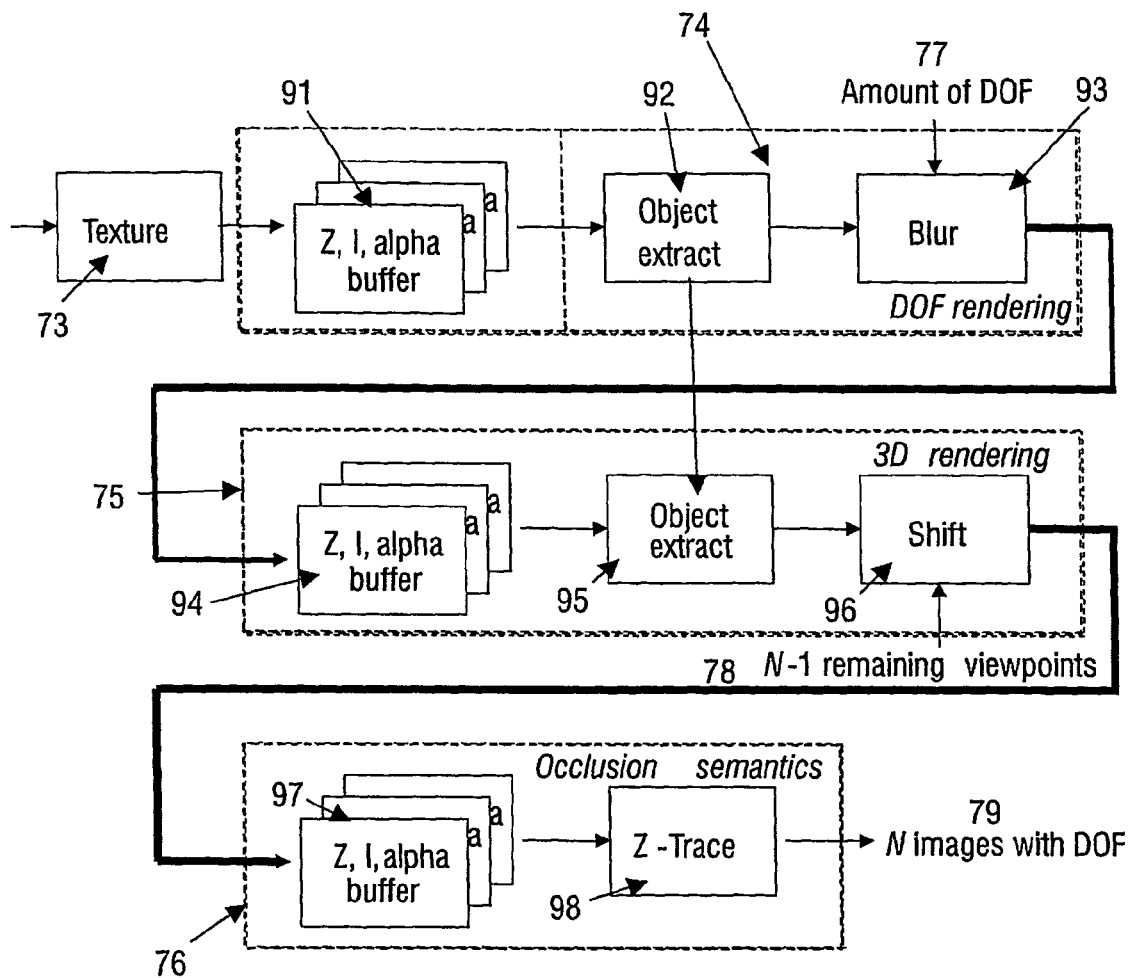
FIG. 9 illustrates details of a render pipe and method in accordance with the invention.

The invention is further illustrated in FIG. 9.

FIG. 9 shows an example of the internal structure of the DOF and 3-D rendering blocks. Each has an additional buffer-stack, in which the results from the previous stage are stored. Further, both have a new unit adopted as object-extraction unit.

The output of the texture stage (basically the 3-D model) is in a first Z-stack constructor rendered in a Z-stack 91. This Z-stack 91 is made for the main viewpoint. The main view Z-stack 91 is used as the starting point for an object extraction 92. An object extraction is a procedure in which from the Z-stack 91 those elements that belong to the same objects are extracted. As can be seen in FIGS. 8A-8C, an object may be distributed over several layers S1 to S3. The object-extraction unit searches through the stack and reassembles the objects. Reassembling the objects can be done making use of the fact that elements of the same object have characteristics in common, such as the RGB value, the Z-value and/or the opaqueness.

In this example after object extraction the data for the main viewpoint are DOF rendered (93). Without DOF (depth of field) rendering all objects would be imaged with the same sharpness. However, this leads to an unnatural image. In a natural image there is a field of focus in which the image is sharp, objects closer to the viewer or further away are out of focus, and thus blurred. Blurring may e.g. be done by extraction followed by defocusing the texture and edges of objects, i.e. redistributing the texture spatially within objects and transferring some of the intensity outside the object boundaries, and/or making the outer most parts of the objects semi-transparent. The DOF rendering stage has for that object a blur unit. The result of the DOF unit is again a Z-stack 94 comprising the somewhat blurred out-of focus objects and the sharp objects in the plane of focus for the main view point. DOF blurring is in this preferred embodiment performed on the data in the Z-stack 91 for the main viewpoint. This is preferred because the computational power needed for DOF blurring is then needed only for the main viewpoint image. Strictly speaking a better performance in respect to the blurring effect of DOF could be obtained when DOF blurring is done for each and every viewpoint. However the DOF for additional viewpoint does not or hardly differs from that for the main viewpoint, so in preferred embodiments DOF is performed on the Z-stack 91 for the main view point. The DOF blurred objects are reassembled into a new Z-stack 94 for the main view point. This Z-stack 94 is an input for an object extractor 95, which extracts the objects. The extracted objects are, for each of the N-remaining view points, shifted in shifter 96 in accordance with the difference in between the main view point and respective the viewpoint. The shifted objects are then reassembled into a new Z-stack (in Z-stack constructor 97), resulting in N−1 Z-stacks. Finally the 3-D rendering stage has a Z-trace unit (98). Within the frame work of the invention the principal point is that for each of additional view points, on the basis of the Z-stack 91 of the main view point, the Z-stacks 97 of for additional view points are constructed. Object extraction 95 is optional. However, object extraction is a very useful concept. When the data of the original Z-stack 91 for the main view point are converted to construct the Z-stack for additional view points, relatively small objects (for instance those objects which are seen under a small angle) may grow substantially in size. When a transformation is done pixel-by-pixel, the objects that have grown in size (for instance from 3 pixels to 10 pixels) necessarily have pixels missing. The missing pixels may e.g. be reconstructed by object extraction and reconstruction, i.e. finding which pixels form a group, detect the presence of a hole (or holes) in the group of pixels, determine as best as possible the values which would fit the elements in the hole(s) (RGB, Z) and fill in the holes and thereby reconstructing the intermediate, missing elements of the group and thereby "repair" the object. This can be done after the shift operation (stage 96). However, then the reconstruction process step has to be repeated N−1 times, namely for each of the Z-stacks resulting from shifting step 96, i.e. for each of the Z-stacks 96 (for simplicity the results of the various method steps are herein sometimes given the reference numeral belonging to the particular step) for the additional view points. By performing object extraction 95 prior to shifting 96 the objects, object extraction needs to be performed only once namely on the main view point Z-stack 94 thereby reducing the complexity of the procedure and increasing the speed.

The number of viewpoints to be calculated and their position/orientation with respect to the main viewpoint may be fixed or, preferably, be dependent on data received from the display. Preferably the system comprises an input (see FIG. 7) for data on additional view points. The Z-stack constructor 75 constructs data for additional view points. It may do so automatically, in which case it could e.g. construct as many Z-stacks 95 as there could be views in autostereoscopic devices, i.e. a large number covering all display devices possible. This would require a large number of additional view points Z-stacks to be constructed. Preferred, however, is that the system comprises an input for supplying data on the additional view points to the additional view point Z-stack constructor. Depending on the type of display devices the number of additional view points may vary. By providing an input for providing specific data on the additional view points (number and/or position/orientation with respect to the main view point) the Z-stack constructor is able to provide additional view point Z-stacks in accordance with the requirements, increasing efficiency. The data on the additional view points, in simple embodiments, could be the number of views to be generated and the maximum viewing angle range.

In preferred embodiments the system comprises means to establish the view points corresponding to the users, or means to be supplied with data corresponding to the view points of the users. For instance when more than one player participates in a 3-D game, the use of goggles, head phones, laser guns, badges etc. could enable the system, if such attributes are provided with means for establishing the position of such attributes with respect to the display device, for instance by means of IR or ultrasound sensors, to establish the precise or approximate location of the player with respect to the display screen of the display device. Providing such information to the additional Z-stack constructor would enable the view points corresponding with the players to be processed with high accuracy or refreshment rate, while data for other view points are not, or at a lower accuracy or refreshment rate processed. This allows a considerable increase in speed and image quality for those view points that actually matter, i.e. the ones relevant for the players, without requiring an increase in costs.

Figure 10:
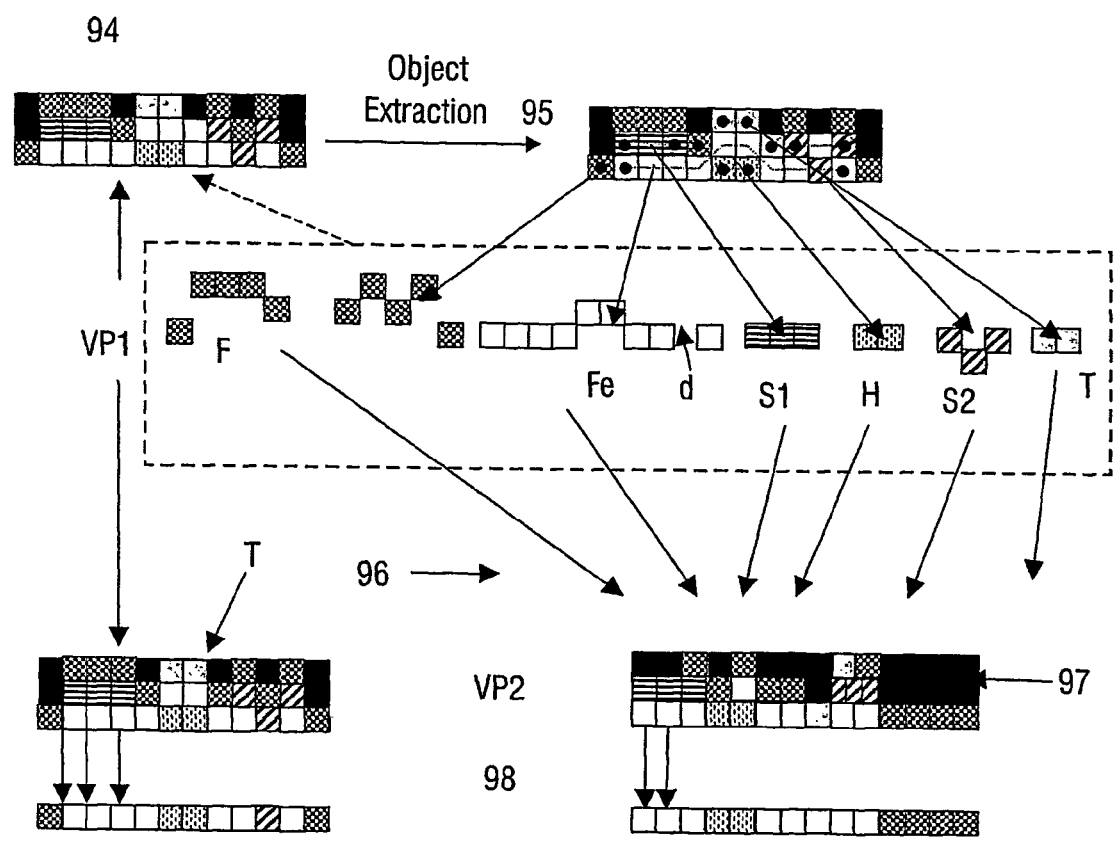
FIG. 10 illustrates further details of a method in accordance with the invention.

FIG. 10 illustrates a method in accordance with the invention. The DOF blurred Z-stack 94 for the main viewpoint is fed to an object extractor. In this example the objects are a house H, two sheds S1, S2, a fence Fe, with a hole (for instance a door d which is opened)in it, a large tree T and a forest F. From the Z-stack 94 for the main view point (VP1, View Point 1) the objects are extracted in object extraction 95. The objects are shifted (basically the x, y, z values are changed, which can easily be calculated on the basis of the main view point and the relevant additional view point). A new Z-stack 97 is calculated on the basis of the new shifted object data. The Z-stack 97 is the basis for the image buffer for the additional views (VP2, view point 2). In the original view point (VP1) a part of the forest was visible through the opening d, in the shifted view point (VP2) a part of the tree (T) is visible through the opening in the fence. Thus in this example it is schematically shown that part of the tree T are visible for the additional view through the opening in the fence. The Z-stack of VP2 is calculated op the basis of the Z-stack for The main view point (VP1) and a simple shifting operation, and thus can be done fast and for many views.

It should be noted that although the invention allows to generate image for additional views with strongly reduced computational power requirements to generate image for additional views compared to rendering N times a new image, the increase in speed does come at a cost. The Z-stack layer comprises a number of layers, in this example 3. If more than three objects are positioned one behind the other, some of the objects will not be present in the Z-stack layer, because they are the fourth, fifth etc. object to be seen from the main view point. Thus a loss in data may occur. Preferably the Z-stack comprises 2 to 5 layers, most preferably 3 to 4 layers. The more layers there are in the Z-stack, the less the chance of a loss of data, however, the higher the computational power required. The inventors have realized that a best compromise may be struck in the indicated range of layers, i.e. 2-5, preferably 3-4, most preferably 3.

A further loss of data may occur when an object (e.g. the side wall of a house) is so oriented that seen from the main view point, it occupies only one or only a small number of pixels. The amount of details one can impart on views from other points of view is then very limited, if at all present. In preferred embodiments the renderer comprises an initial part having an input for the 3-D model and for a number of n main view points for rendering objects in the form of n main view point Z-stacks comprising stack layers comprising color information (RGB) and Z-values, the renderer further comprising a Z-stack constructor in which, from the n main view points Z-stacks generated by the initial stage, Z-stacks for N-n additional viewpoints are constructed, wherein N>>n, and a further image information occlusion semantics stage for generating image information from the Z-stacks.

The advantage of having n main viewpoints is that it allows selection of the best main viewpoint to construct an object in an additional viewpoint. The selection is based on which main viewpoint contains the object with the highest detail, that is, represented by the most elements. Also, a combination could be made, e.g. by interpolation of the object's representation in the n main viewpoints. In most current 3-D displays, N views are needed with the viewpoints positions being arranged on a horizontal line, allowing a horizontal look-around capability. Then, preferably n=2.

The computational power required for the first stage is doubled, but for the following stage it stays more or less the same. The n=2 main viewpoints can be selected as the extreme left and right viewpoints. In this way, it is ensured that each object is represented in one of the 2 main views with more detail than needed for each additional viewpoint.

Similarly, future 3-D displays may provide $N=N_xN_y$ views arranged in a grid of horizontal and vertical positions to provide a vertical look-around capability. Then, preferably, n=4, with the main viewpoints corresponding to the 4 corners of the grid: top-left, top-right, bottom-left, bottom-right.

A further loss of data may occur due to the finite horizontal and vertical dimensions of the Z-stacks. As objects have different position within each Z-stack, it may happen for some viewpoints that they are no longer present within that Z-stack: they dropped out of sight. It may happen that an object lies just beyond the border of the main viewpoint, disabling its construction in the additional viewpoints. This can be solved by the method described above having n main viewpoints. If an object is not visible in one of the main viewpoints, then it is highly likely visible in one of the other main viewpoints. When n=1 is used, a preferable other solution is to increase the horizontal (and or vertical) dimension of the main Z-stack with Q extra elements, while all additional Z-stacks retain their original dimensions. This ensures that the main Z-stack does contain objects that shift into view only for the additional viewpoints. In this case, the main viewpoint frame buffer also has the original, un-increased size. Possibly a combination is used between the increased dimension solution and the n main viewpoint solution.

A further loss of data may occur due to the resampling of objects from the main viewpoint to the additional viewpoints. This may be solved by having a main viewpoint with increased resolution, e.g. a factor of two more elements in horizontal and/or vertical direction. In this way, the data loss will be negligible. Within the solution with n main viewpoints, it may be possible to extract an object in more resolution from n normal resolution Z-stacks by well known super-resolution techniques. However, current techniques for this do not ensure performance in all situations, e.g. in the degenerate case where the n main viewpoints contain exactly the same information of an object. The resolution increase method ensures performance in all situations.

It will be clear that within the concept of the invention many variations are possible. It will be appreciated by persons skilled in the art that the present invention is not limited by what has been particularly shown and described hereinabove. The invention resides in each and every novel characteristic feature and each and every combination of characteristic features. Reference numerals in the claims do not limit their protective scope. Use of the verb "to comprise" and its conjugations does not exclude the presence of elements other than those stated in the claims. Use of the article "a" or "an" preceding an element does not exclude the presence of a plurality of such elements.

The invention is also embodied in any computer program comprising program code means for performing a method in accordance with the invention when said program is run on a computer as well as in any computer program product comprising program code means stored on a computer readable medium for performing a method in accordance with the invention when said program is run on a computer, as well as any program product comprising program code means for use in a system in accordance with the invention, for performing the action specific for the invention. The method in accordance with the invention is not restricted to the given examples. For instance, there were mention is made of data for supply to addressing means, it is not excluded that the data undergo some sort of calculation step before being supplied to the addressing means. For instance, there may be some steps to convert the "raw image data" 79 to a format most suitable for a particular type of display or a particular type, or the data may be encrypted. Thus the term "for supply to addressing means" is not to be interpreted restrictively as to mean that the data has to be fed directly to addressing means, in the exact form as they exit the renderer, the data are to be used for feeding to addressing means, i.e. as the basis for the images shown on the display screen.

The invention is also embodied in a renderer for use in a system in accordance with the invention. The invention is also embodied in a renderer for rendering data in the form of Z-stacks for different views as a basis for addressing a display screen of a 3-D display device. The renderer may operate separately from the system itself, for instance on a remote computer.

The invention claimed is:
1. A system comprising:
   a 3-D display device with a display screen;
   addressing means for addressing the display screen; and
   a renderer having an input for a 3-D model and an input for at least one view point for rendering image information for supply to the addressing means,
   wherein the renderer comprises:
      an initial part having the input for the 3-D model and for a main view point for rendering objects in a form of a main view point Z-stack, the Z-stack comprising stack layers including color information and Z-values;
      a Z-stack constructor in which, from the main view point Z-stack generated by the initial stage, additional Z-stacks for additional view points are constructed; and
      an image information occlusion semantics stage for generating image information from the Z-stacks,
   wherein the renderer further comprises a depth-of-field (DOF) rendering stage,
   and wherein the DOF rendering stage is arranged for DOF processing of the main point view Z-stack into a blurred main view point Z-stack comprising DOF blurring.
2. A system comprising:
   a 3-D display device with a display screen;
   addressing means for addressing the display screen; and
   a renderer having an input for a 3-D model and an input for at least one view point for rendering image information for supply to the addressing means,
   wherein the renderer comprises:
      an initial part having the input for the 3-D model and for a main view point for rendering objects in a form of a main view point Z-stack, the Z-stack comprising stack layers including color information and Z-values;
      a Z-stack constructor in which, from the main view point Z-stack generated by the initial stage, additional Z-stacks for additional view points are constructed; and
      an image information occlusion semantics stage for generating image information from the Z-stacks,
   wherein the renderer further comprises an object extractor for extraction of objects from a view point Z-stack,
   and wherein the main point view Z-stack data comprises data on the opacity, and the Z-stack constructor comprises means for adapting, after object extraction, the opacity of objects.
3. A system comprising:
   a 3-D display device with a display screen;
   addressing means for addressing the display screen; and
   a renderer having an input for a 3-D model and an input for at least one view point for rendering image information for supply to the addressing means,
   wherein the renderer comprises:
      an initial part having the input for the 3-D model and for a main view point for rendering objects in a form of a main view point Z-stack, the Z-stack comprising stack layers including color information and Z-values;
      a Z-stack constructor in which, from the main view point Z-stack generated by the initial stage, additional Z-stacks for additional view points are constructed; and
      an image information occlusion semantics stage for generating image information from the Z-stacks,
   wherein the renderer further comprises an object extractor for extraction of objects from a view point Z-stack,
   and wherein the Z-stack constructor further comprises means for adapting, after object extraction, color values of the objects.
4. A system comprising:
   a 3-D display device with a display screen;
   addressing means for addressing the display screen; and
   a renderer having an input for a 3-D model and an input for at least one view point for rendering image information for supply to the addressing means,
   wherein the renderer comprises:
      an initial part having the input for the 3-D model and for a main view point for rendering objects in a form of a main view point Z-stack, the Z-stack comprising stack layers including color information and Z-values;
      a Z-stack constructor in which, from the main view point Z-stack generated by the initial stage, additional Z-stacks for additional view points are constructed; and
      an image information occlusion semantics stage for generating image information from the Z-stacks,
   wherein the renderer is configured to:
      determine an object in the main view point z-stack by grouping elements having similar z-values in the main view point z-stack;
      scale the elements to form scaled elements; and
      copy the object into the additional Z-stacks for the additional view points to form a scaled object using the scaled elements.
5. A system comprising:
   a 3-D display device with a display screen;
   addressing means for addressing the display screen; and a renderer having an input for a 3-D model and an input for at least one view point for rendering image information for supply to the addressing means, wherein the renderer comprises:

an initial part having the input for the 3-D model and for a main view point for rendering objects in a form of a main view point Z-stack, the Z-stack comprising stack layers including color information and Z-values;

a Z-stack constructor in which, from the main view point Z-stack generated by the initial stage, additional Z-stacks for additional view points are constructed; and an image information occlusion semantics stage for generating image information from the Z-stacks, wherein the renderer is configured to:

perform blurring of the main view point Z-stack to form a blurred main view point Z-stack; and generate blurred additional Z-stacks from the blurred main view point Z-stack.

6. A system comprising:

a 3-D display device with a display screen;

addressing means for addressing the display screen; and a renderer having an input for a 3-D model and an input for at least one view point for rendering image information for supply to the addressing means, wherein the renderer comprises:

an initial part having the input for the 3-D model and for a main view point for rendering objects in a form of a main view point Z-stack, the Z-stack comprising stack layers including color information and Z-values;

a Z-stack constructor in which, from the main view point Z-stack generated by the initial stage, additional Z-stacks for additional view points are constructed; and an image information occlusion semantics stage for generating image information from the Z-stacks, wherein the renderer is configured to select the main view point from among a plurality of main view points, wherein the selected main view point has more elements than other ones of the plurality of main view points.

7. A method for rendering data comprising the acts of:

rendering, for a main view point, objects in a form of a main view point Z-stack, the main view point Z-stack comprising stack layers having color values and Z-values;

from the main view point Z-stack, constructing additional Z-stacks for additional view points; and from the additional Z-stacks, generating, by means of Z-tracing, data to be supplied to an addressing means or a 3-D display device, wherein said method further comprises the acts of:

determining an object in the main view point z-stack by grouping elements having similar z-values in the main view point z-stack;

scaling the elements to form scaled elements; and copying the object into the additional Z-stacks for the additional view points to form a scaled object using the scaled elements.

8. A method for rendering data comprising the acts of:

rendering, for a main view point, objects in a form of a main view point Z-stack, the main view point Z-stack comprising stack layers having color values and Z-values;

from the main view point Z-stack, constructing additional Z-stacks for additional view points; and from the additional Z-stacks, generating, by means or Z-tracing, data to be supplied to an addressing means of a 3-D display device, wherein said method further comprises the acts of:

performing blurring of the main view point Z-stack to form a blurred main view point Z-stack; and generating blurred additional Z-stacks from the blurred main view point Z-stack.

9. A method for rendering data comprising the acts of:

rendering for a main view point, objects in a form of a main view point Z-stack, the main view point Z-stack comprising stack layers having color values and Z-values;

from the main view point Z-stack, constructing additional Z-stacks for additional view points; and from the additional Z-stacks, generating, by means or Z-tracing, data to be supplied to an addressing means of a 3-D display device, wherein said method further comprises the act of:

selecting the main view point from among a plurality of main view points, wherein the selected main view point has more elements than other ones of the plurality of main view points.

\* \* \* \* \*